United States Patent [19]
King

[11] 3,715,975
[45] Feb. 13, 1973

[54] FOOD HEATING DEVICE

[75] Inventor: Leonard Tony King, Long Beach, Calif.

[73] Assignee: Speedline Partnership, San Francisco, Calif.

[22] Filed: May 11, 1971

[21] Appl. No.: 142,243

Related U.S. Application Data

[63] Continuation-in-part of Ser. No. 48,209, June 22, 1970, which is a continuation-in-part of Ser. No. 629,315, April 7, 1967, abandoned.

[52] U.S. Cl. ............... 99/331, 99/171, 99/339, 99/358
[51] Int. Cl. ............................................. A47j 27/62
[58] Field of Search........99/358, 339, 171, 221, 233, 99/253, 274; 219/383, 385

[56] References Cited

UNITED STATES PATENTS

| | | | |
|---|---|---|---|
| 2,532,014 | 11/1950 | Davis | 99/358 X |
| 2,013,675 | 9/1935 | Steerup | 99/182 |
| 3,573,430 | 4/1971 | Eisler | 99/171 X |
| 2,182,383 | 12/1939 | Lang et al. | 99/358 X |
| 2,474,390 | 6/1949 | Aff | 99/358 X |
| 2,844,695 | 7/1958 | McLean | 99/358 X |
| 3,210,199 | 10/1965 | Schlaf | 99/358 UX |
| 3,257,934 | 6/1966 | Korr | 99/358 |
| 3,385,952 | 5/1968 | Mix | 99/171 X |
| 3,296,415 | 1/1967 | Eisler | 219/385 |

Primary Examiner—Billy J. Wilhite
Attorney—Limbach, Limbach & Sutton

[57] ABSTRACT

A food heating device for heating and cooking food items such as TV-dinners that are prepackaged in standard electrically conductive containers. A rigid secondary winding from a step-down transformer supports the opposed ends of the conductive food package for passing a high current directly through the food package and at least some of the food contained therein for rapidly and efficiently heating the food. Resistance and reactance losses are minimized by holding the container close to the transformer and by assuring a low resistance connection to the container. Means are provided for assuring uniform heating of the container contents and for sensing the average temperature of the container.

17 Claims, 13 Drawing Figures

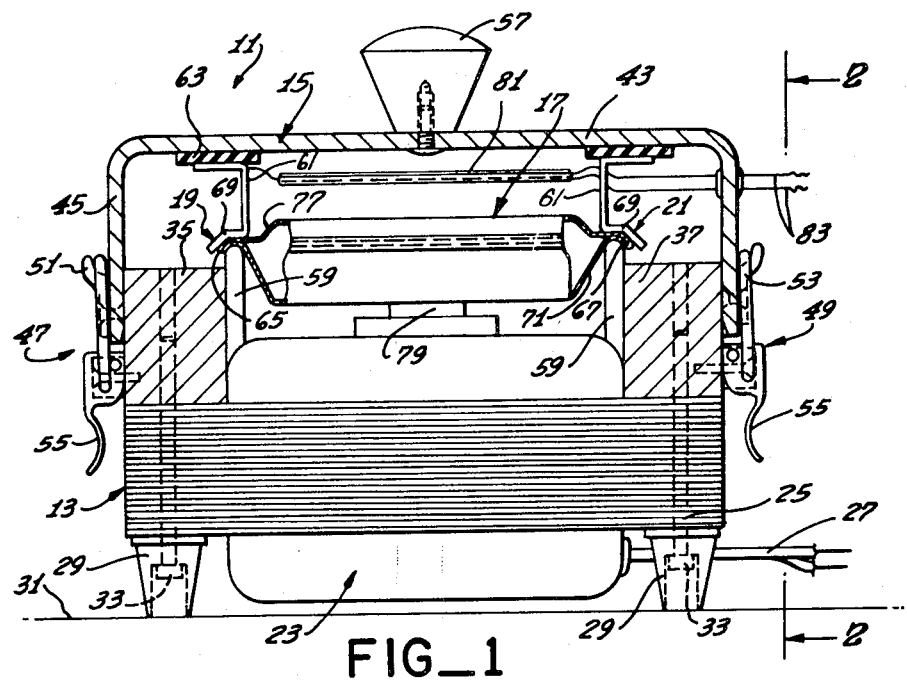
FIG_1
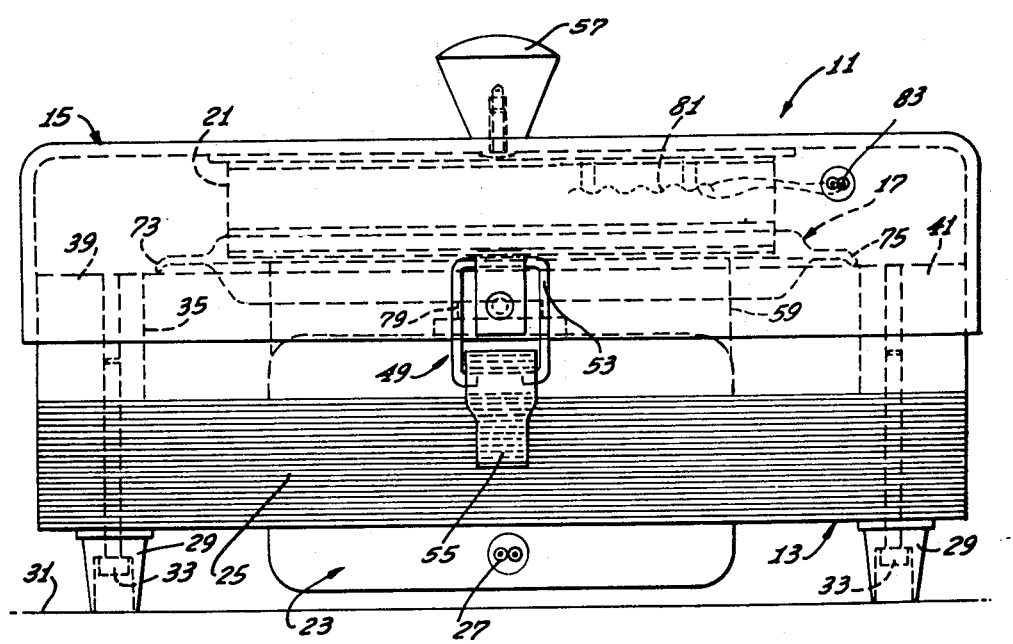
FIG_2

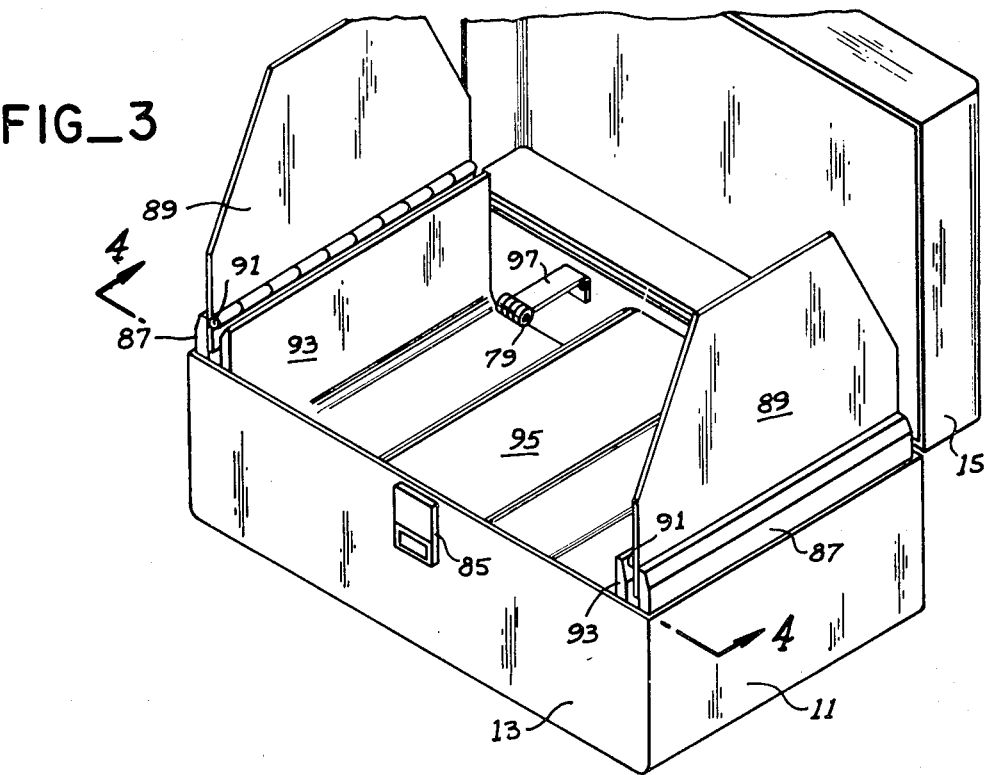
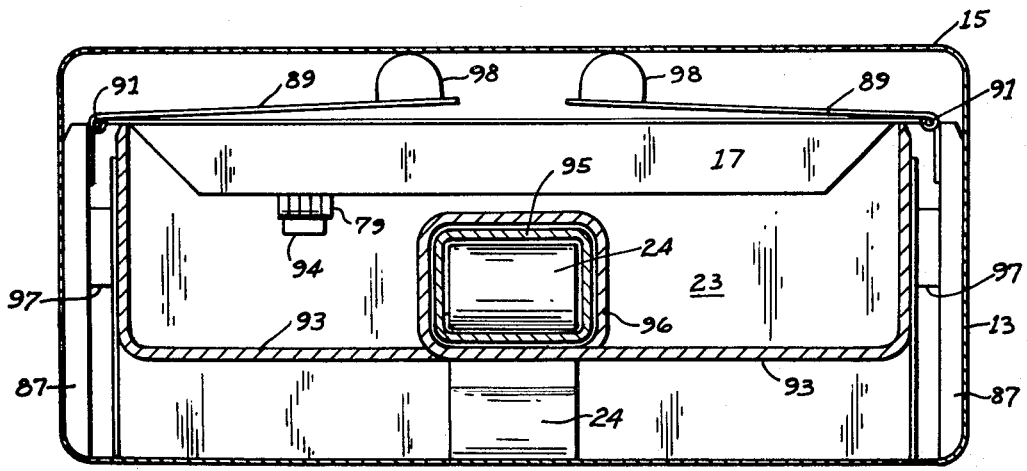

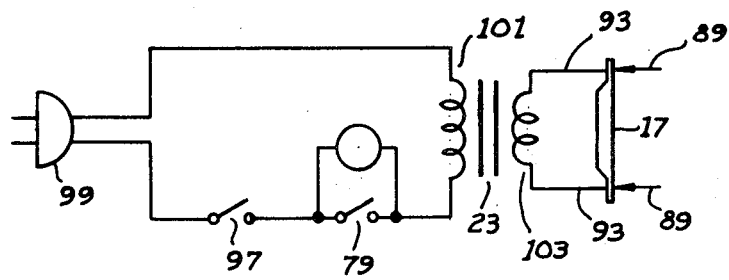
FIG_5
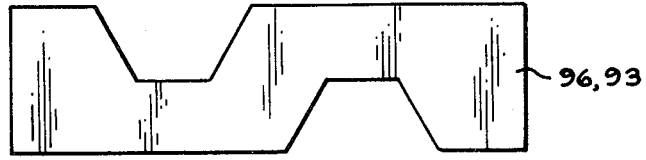
FIG_6
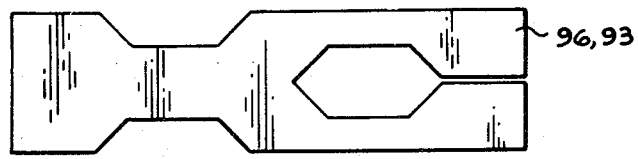
FIG_7
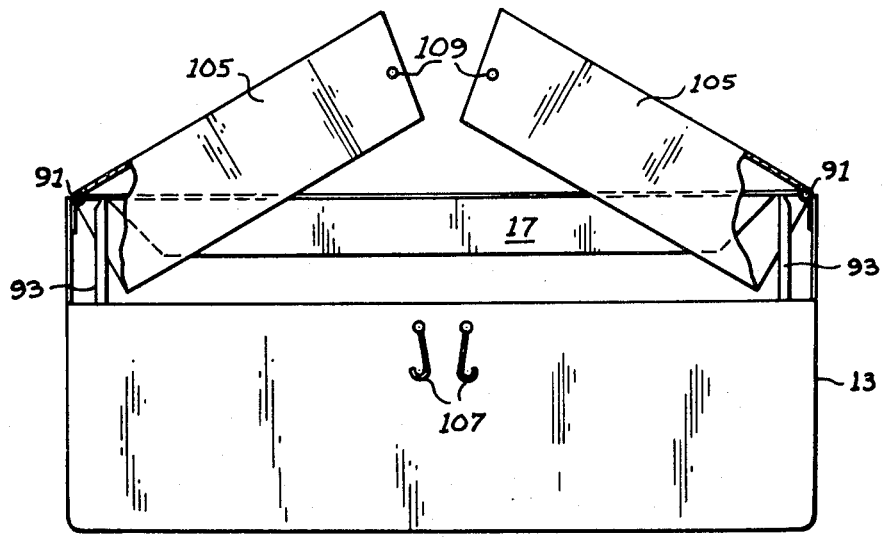
FIG_8

INVENTOR.
LEONARD TONY KING
BY
ATTORNEYS

EQUIPOTENTIAL LINES -----

CURRENT LINES ———

INVENTOR.
LEONARD TONY KING
BY
Limback, Limback and Sutton
ATTORNEYS

FOOD HEATING DEVICE

BACKGROUND OF THE INVENTION

This application is a continuation-in-part of copending application Ser. No. 48,209, filed June 22, 1970, which is a continuation-in-part of copending application Ser. No. 629,315, filed Apr. 7, 1967, now abandoned.

Various prepackaged food items of which TV-dinners are exemplary are now sold in containers constructed entirely of a conductive material such as aluminum foil. It is common practice to heat or cook TV-dinners in a conventional oven. As is well known, in conventional ovens gas or electric heating elements heat the walls of the oven and the air within. The heated air in turn heats the food item. This is a slow and inefficient operation and may consume up to 45 minutes of time.

On the other hand, microwave ovens will thoroughly and rapidly heat food items. However, these ovens are very expensive and not feasible on a domestic scale. Moreover, they cannot be used to heat foods held in metallic containers.

Several prior art devices heat packaged food items by passing electrical current directly through a specially constructed food package. This has the advantage of more rapidly heating the food item. However, these prior art heaters require a specially constructed container for the food. Often these containers include several layers of different materials and this significantly increases the cost of the food package. Furthermore, each of these special heaters are substantially restricted in their use to food packages which have been specially designed for use therewith.

Specific examples of prior art devices include U.S. Pat. No. 3,210,199 to S.O. Schlaf wherein a special container for the food is provided. Also U.S. Pats. No. 3,230,861 and 3,257,934 to A. L. Korr require the food to be placed in a special container. U.S. Pat. No. 2,182,383 to O. W. Lang et al, provides for heating food during a canning process by passing current through a tin can.

One problem in prior art devices is leakage reactance loss resulting from long secondary leads and resistance losses caused by poor electrical connections to the food container.

One problem encountered in heating TV-dinners by passing electrical current between their edges is that the rolled edge of the typical TV-dinner aluminum tray acts as a heavy conductor of relatively low resistance. This causes a higher current density to flow at the tray periphery causing local heating and resulting in nonuniform heating overall. This effect is further aggravated by the fact that the sides of the typical TV-dinner tray are angled at about 60°. This means that the equivalent projected thickness at the edge is doubled; i.e., the current density is increased contributing even more to uneven heating. It has been found that is such a tray has electrical connection applied substantially across the full width of the ends that a disproportionate share of the current will flow around the periphery of the tray, giving rise to nonuniform heating. In addition, burning of food adjacent the ends of the TV-dinner tray tends to occur due to the high current densities where current enters and leaves the tray.

A further problem is the heating of the transformer secondary. The secondary of the transformer is heated from two major sources: 1) $I^2R$ losses in the material of the secondary itself; 2) direct heat conduction from the ends of the hot dinner.

$I^2R$ losses produce substantially uniform heating of the secondary since the cross-sectional area of the secondary is substantially uniform along its length in the interests of optimum weight design. On the other hand, the dinner tray heats the secondary primarily at the ends.

In the heating of TV-dinners, it is, of course, necessary to sense the temperature of the tray. Sensing a particular spot is undesirable since the different dinner types vary widely in what kind of food is put into a given compartment. A tray segment containing french fries, for example, tends to get much warmer than one containing stewed apples.

SUMMARY OF THE INVENTION

The present invention overcomes the above noted disadvantages in providing an inexpensive and efficient heating device which rapidly heats prepackaged food items. The heating device of the present invention is particularly adapted for use with the standard disposable prepackaged food packages such as TV-dinners and the like and requires no specially designed container. With the present invention the food is rapidly heated in the standard conductive container in which it was packaged and sold to the consumer.

The present invention accomplishes these advantageous results by passing electrical current directly through the standard conductive container which contains the food. The food is in contact with the conductive container and depending upon the particular characteristics thereof, some current will also pass directly through the food. Thus, substantially all of the energy applied is dissipated as heat in the food producing very rapid and efficient heating without need for a special container for the food.

To further assure rapid and even heating of the food, it is preferred to pass current from one longitudinal edge to the opposed longitudinal edge of the container. Preferably the current is applied along the full length of the opposed longitudinal edges of the container. Many of these standard containers have an aluminum foil conductive top layer or cover so that the current is passed through the package in parallel paths defined by the cover and the body of the container, respectively. This provides heat all around the food item.

With the present invention, prepackaged food items such as a TV-dinner can be fully prepared for eating in from about 90 seconds to 7 minutes. Alternating current at low voltage, for example, 0.6 volts is used. This provides rapid heating of the food package while making the package safe against electrical shocks.

Another advantageous feature of the present invention is that the electrical current is passed directly through at least some of the food within the conductive container. As the temperature of the metal container rises, the resistance thereof will increase; however, as the temperature of the water within or around the food rises, the resistance thereof, decreases. Therefore, as the entire food package is heated, a larger proportion of the current is passed directly through the food to further increase the speed and efficiency of the heating device.

A further advantageous feature of the invention is that resistance and leakage reactance losses are minimized.

The concepts noted above are applicable to food heating and preparation in various environments not only as vending machines but preferably in simple, inexpensive domestic appliances for heating prepackaged food items such as TV-dinners. Such an appliance in one embodiment includes a rigid enclosure for enclosing the food package. The enclosure includes a base on which the conductive container is supported and a removable cover for providing access to the interior of the enclosure. Low voltage alternating current is provided by a step-down transformer which is electrically connectable to standard line voltage. A pair of clamps are mounted on the enclosure for gripping the opposed edge portions of the conductive container to pass the low voltage current therethrough. In an alternative embodiment a hinged cover is provided on the base; the cover when closed hold a pair of hinged clamps against the opposed edge portion of the container. In a further embodiment, a pair of hinged covers also function to clamp the package edges when the cover is closed.

In one preferred form of the domestic appliance, the transformer forms all or a portion of the base. Each of the clamps includes an elongated rigid member or first jaw mounted on the base and extending upwardly therefrom. These upright members are spaced an amount corresponding to the distance between edge portions of the conductive container. The spacing between edge portions may be variable, if desired, to accommodate food packages of different sizes. The removable cover contains a second rigid member which forms the second jaw of the clamp. When the cover is in position to close the enclosure, the two rigid members automatically grip the opposed edge portions of the conductive container. Thus, be merely placing the conductive container in the enclosure, the container automatically engages the upright rigid member which serves as the lower jaw of the clamp and as supporting means for the container. The closing of the cover closes the enclosure and automatically clamps the conductive container in position.

In an alternative preferred embodiment of the domestic applicance, a rectangular parallepiped enclosure is provided with a cover portion hinged along one edge of the enclosure. The step-down transformer is supported centrally in the enclosure and a pair of conductive panels insulated from the enclosure, connected to the transformer secondary, extend outward from the transformer and upward parallel to opposed sides of the enclosure. Support for food packages to be heated is supplied by the upward panel portion. Panels serving as clamps and hinged adjacent to the conductive panels clamp the food package against the conductive panels when the enclosure cover is closed.

In a further preferred embodiment, the hinged clamps also serve as an enclosure cover by a proper choice of dimensions thereby eliminating a separate cover.

A thermostat is preferably mounted to engage or substantially engage the conductive container for automatically opening the circuit to the transformer when the conductive container reaches a predetermined temperature. In addition, a resistive heating element may be provided above the container, if desired to provide additional heat to particular portions of the device, such as "browning" of french fries, muffins, etc.

In order to minimize the problems of nonuniform heating throughout the tray one or a combination of solutions are employed. First, by making the width of the contact less than the full tray width, about half, for example, the current density in the tray is altered to reduce the high density along the edges between the two opposed contacts. To further enhance a uniform current distribution, the narrowed contact may be provided with a non-contacting or insulated gap in the center of each contact support to provide effectively two contacts along each edge. Theoretically, the contact could be broken up more, however little practical improvement would be gained. Second, by employing massive clamps and/or supports at the ends of the tray, thermal cooling of the food in the end of the tray is provided to correct for the additional heating received by that food due to the sloping ends of the tray. Cooling fins such as used in transistor heat sinks may also be used. Third, contact studs between the secondary and the bottom surface of the tray may be provided. They may be regarded as partially "shorting out" the TV-dinner tray between the stud and the main clamp. It turns out that to be quite effective the stud does not have to make perfect contact as long as the contact resistance is lower than that of the tray between the stud and the main contact. Even if $I^2R$ losses do occur at the stud contact, most of the power loss disappears into the dinner since nucleate boiling effects induced in the dinner produce a very high effective thermal conductivity at the dinner side of the contact. Thus, most of any energy loss at the contact passes into the dinner as heat. Another way of looking at the problem is to consider the equipotential distribution and current flow paths. The latter show clearly how one may now concentrate power at essentially any spot or spots one chooses—in this case, the center of the heaviest part or parts of the dinner. Thus, the current distribution can be controlled with a high degree of flexibility.

In order to reduce heating of the secondary, i.e., to increase the thermal isolation of the secondary from the ends of the container being heated, a narrowing of the cross-sectional area of the secondary near the secondary ends is introduced thereby introducing thermal resistance. Since most of the temperature drop occurs in the secondary near the dinner contact, if the thermal resistance is introduced in that area a substantial thermal isolation is achieved with a modest increase in $I^2R$ losses.

In order to measure the average temperature of the container rather than a particular spot, a thermal integrating plate is provided contacting or adjacent but spaced from the bottom of the container. The plate will ordinarily be thermally conductive but have an electrically non-conductive surface anodized aluminum, for example. A thermostat is attached to the plate. The plate is substantially co-extensive with the transverse and longitudinal dimensions of the container. If contact studs are employed, they may pass through holes in the plate. The studs thus may also serve to assure accurate spacing between the bottom of the container and the plate.

The invention, both as to its organization and operation together with further features and advantages thereof may best be understood by reference to the following description taken in connection with the accompanying drawings.

BRIEF DESCRIPTION OF THE DRAWINGS

FIG. 1 is an end elevational view partially in section of a heating appliance according to one embodiment of the present invention.

FIG. 2 is a front elevational view of the heating device taken along section line 2—2 of FIG. 1.

FIG. 3 is a perspective view of a heating appliance according to another embodiment of the instant invention.

FIG. 4 is a cross-sectional front elevational view of the heating applicance of FIG. 3.

FIG. 5 is a schematic circuit diagram of a heating appliance according to an embodiment of the invention.

FIG. 6 is a plan view of an unfolded secondary winding.

FIG. 7 is a plan view of an alternative unfolded secondary winding.

FIG. 8 is a front elevational view of a heating appliance according to a further embodiment of the present invention.

DESCRIPTION OF THE PREFERRED EMBODIMENTS

Figure 9:
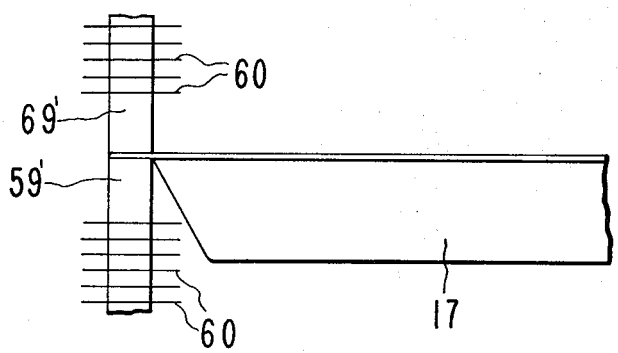
FIG. 9 is a cut-away side elevation view of the modified clamp and secondary contact ends usable in the heating appliance of FIGS. 1, 3, 5 or 8.

Referring to the drawing, wherein the same reference numerals will be carried throughout the various figures to refer to like or identical parts, reference numeral 11 designates a heating device in the form of an inexpensive appliance constructed in accordance with the teaching of this invention.

Generally, in the embodiment of FIGS. 1 and 2, the heating device 11 includes a base 13 and a removable or openable cover 15 which coacts with the base 13 to form an enclosure for a food package 17. The food package 17 is held within the enclosure by a pair of clamps 19 and 21.

The base 13 is formed primarily by a transformer 23. The transformer 23 has the usual primary and secondary windings and an enlarged core 25 which forms a major portion of the base 13. The transformer 23 is of the step-down type and is connectible to a standard 110 volt AC outlet by a pair of leads 27.

The base 13 also includes four feet 29 constructed of rubber or similar material for supporting the heating device 11 or a suitable supporting surface 31. The feet 29 may be suitably attached to the core 25 by bolts 33. Two elongated block members 35 and 37 are suitably attached to the upper surface of the core and extend longitudinally for almost the full length of the core 25 as shown in FIG. 2. A second pair of block members 39 and 41 (FIG. 2) are secured to the core 25 by the bolts 33 and extend transversely of the heating device 11 along the periphery of the core.

The cover 15 includes a top wall 43 and a peripheral wall 45 depending therefrom and overlapping the block members mounted on the core 25. The cover 15 should be completely removable from the base 13 or at least be pivotable to a position in which access to the interior of the enclosure is provided. In the embodiment illustrated the cover 15 is releasably secured to the base 13 by a pair of conventional toggle latches 47 and 49. Each of the toggle latches 47 and 49 includes an upper or fixed latching member 51 rigidly affixed to the peripheral wall 45, a lower or movable latching member 53, and a toggle lever secured to the adjacent block member for operating the movable latching member 53. A handle 57 in the form of a knob is secured to the top wall 43 of the cover 15.

The clamps 19 and 21 are identical and each of these clamps includes an elongated upright rigid member 59 secured to or forming a part of the base 13 and an upper elongated rigid member 61 suitably secured to the top wall 43 but insulated therefrom by an insulator 63.

Each of the upright members 59 extends longitudinally for substantially the full longitudinal length of the food package 17. Each of the upright members 59 is a conductor electrically connected to or forming a part of the secondary of the transformer 23. Preferably, the upright members 59 are secured to the adjacent block members 35 and 37 so that these block members will provide support for the upright member.

As shown in FIG. 1, the food package 17 has opposed conductive longitudinal edge portions 65 and 67. These edge portions rest on the upright members 59 as shown and thus, the upright members 59 form supporting means for the food package 17.

The upper members 61 preferably extend longitudinally for substantially the full longitudinal length of the edge portions 65 and 67 and include jaw portions 69 which cooperate with the upper ends of the associated upright members 59 to securely clamp the edge portions 65 and 67 when the cover 15 is mounted on the base 13 as shown in FIG. 1.

The clamps 19 and 21 are spaced apart a distance to accommodate a TV-dinner of a standard size. This spacing between the clamps 19 and 21 can be varied if desired, to accommodate food packages of different dimensions.

The electrical current is supplied to the food package 17 through the clamps 19 and 21 and it is preferred to provide the clamps along the longitudinal edges of the food package 17. However if desired, the clamps may extend along the transverse edge portions of the food package 17.

The food package 17 is of a standard type and include a container 71 of conductive material such as aluminum foil. The container 71 has the longitudinal edge portions 65 and 67 and transverse edge portions 73 and 75 (FIG. 2) all of which have substantial length.

The container 71 may have a plurality of the usual compartments (not shown) for containing different food items. The container 17 has an upper wall 77 of conductive material such as aluminum foil which completely closes the upper end of the container 71. The container 71 and the upper wall 77 provides two parallel paths for the flow of current between the clamps 19 and 21 to provide heat completely around the food contained within the food package 17. The clamps 19 and 21 should engage generally opposed substantially spaced portions of the food package 17 to assure that the resistance provided by each of the parallel paths will not be grossly disproportionate to obtain reasonably even heating across the top and the bottom of the food package.

A thermostat 79 is mounted on the base 13 in a position in which it is engageable with the lower surface of the container 17. The thermostat 79 is connected to a switch (not shown) and automatically opens such switch when the temperature of the container 71 reaches a predetermined value such as the boiling point of water. Opening of this switch opens the circuit to the transformer. If desired, the thermostat 79 could also be arranged to close that switch if the temperature of the container 71 dropped below a predetermined value.

A resistive heating element 81 is mounted on the cover 15 for providing additional heat to a preselected location of the food package 17. The resistive element 81 may be as large as desired, but usually will be of lesser area in plan than the food package 71 so that preselected areas of the food package 71 can be provided with additional heat such as may be required for browning certain food items contained therein. In the embodiment illustrated, the heating element 81 extends substantially the full transverse width of the food package 17 and less than half of the longitudinal length of the food package. The heating element 81 may be provided with electrical current through separate leads 83 or through the upper member 61 of the clamps 19 and 21 if the member 61 is made of conductive material. A switch (not shown) may be provided to open and close the circuit to the heating element 81 without effecting the current flow to and through the food package 17.

To use the food heating device 11, the cover 15 is removed and the food package 17 is placed on the base 13 with the upright members 59 supporting the longitudinal edge portions 65 and 67. Next, the cover 15 is placed over the base 13 and the toggle latches 47 and 49 are operated to tightly secure the cover to the base. This causes the jaw portion 69 of the clamps 19 and 21 to close tightly against the upper surface of the longitudinal edge portions 65 and 67 of the food package 17. In this position, the clamps 19 and 21 engage the longitudinal edge portions 65 and 67 along substantially the full width thereof and the container 71 and the upper wall 77 thereof provide two parallel paths for the flow of current between two clamps 19 and 21.

By operating an appropriate switch (now shown) the transformer 23 supplies current to the clamps 19 and 21. The transformer 23 may, for example, reduce 110 volt AC line voltage to about 0.6 volts. Current is thus supplied through the container 71 and the food therein to rapidly and efficiently heat the food. As the temperature of the food increases, the water content thereof offers proportionately less resistance to the flow of current and accordingly, the amount of current flowing through the food items themselves is increased. When the food within the food package 17 is thoroughly heated, the thermostat 79 is operative to open the circuit to the food package 17. The time required may be, for example, about 6 minutes.

If it is desired to utilize the resistive heating element 81, the foil forming the upper wall 77 may be peeled back to expose the food items directly beneath the resistive heating element 81. The resistive heating element 81 is supplied with current simultaneously with the application of current directly to the food package 17 to allow the resistive heating element to brown the exposed portions of the food item therebelow. The food heating device may be sufficiently large to simultaneous heat several TV-dinners, if desired.

In FIGS. 3 and 4 an alternative embodiment of the heating device 11 is shown having a base 13 with a cover 15 hinged along the top rear edge of the base portion. When cover 15 is closed, a rectangular parallelepiped enclosure is formed. Cover 15 is secured in the closed position by a latching member 85. A latching member (not shown) is provided on cover 15 to mate with member 85. A pair of rigid upright supports 87 along the inside transverse sidewalls of base 13 support a pair of clamping plates 89. Plates 89 are attached by hinges 91 and are free to rotate downward until engaged by the upward extending portions of curved panels 93. The top edges of panels 93 are spaced so as to support the transverse edges of a standard conductive food package. Panels 93 are conductive and are an extended portion of the secondary of a transformer 23 located centrally in the base 13. Transformer 23 has a C-shaped core 24, a primary winding 95, and a secondary 96. The secondary may be a single turn winding and may be integral with panel pieces 93. Thus for example, secondary 96 and panels 93 could be a single piece formed in an S-shape as shown unfolded in FIG. 6. The central portion of piece 96 would be wrapped around transformer primary 24. A second alternative is shown in FIG. 7, wherein the combination secondary 96 and conductive panel 93 is a modified horseshoe-shaped piece. The left hand portion would be looped around and threaded through the right central operative in order to encircle transformer primary 24. By making the support a portion of the transformer secondary, the voltage drop is kept low and the close proximity of the food container to the transformer reduces leakage reactance loss. In effect the container too becomes a part of the secondary.

Panels 93 are insulated from the base portion 13 by insulating material 97. Clamping panels 89 are formed from electrically non-conductive material. A pair of stops 98 located at the ends of clamps 89 farthest from the hinge points engage the cover 15 when the unit is closed. Thus a food container 17 is placed over conductive end supports 93, clamps 89 are folded down over the container, and cover 15 is closed thereby forcing a tight low-resistance contact between the transverse edges of conductive container 17 and the conductive panels 93 of the transformer secondary. A thermostat 79 is provided on a spring support 94 so as to engage the food package 17 when it is in place.

FIG. 5 shows the electrical connection of the heating appliances. One side of primary 101 of step-down transformer 23 is connected to one pin of line plug 99. The other side of primary 101 is interrupted by a single-pole, single throw on/off switch 97 and a thermostat 79. When the thermostat reaches a predetermined minimum temperature its associated switch opens thus removing the line voltage from primary winding 101. The secondary winding 103 is connected to the edges of a conductive food container 17 via conductors 93 and good electrical contact is maintained by clamps 89.

In FIG. 8 a modification of the heating unit of FIGS. 3 and 4 is depicted having generally the same base and internal structure including conductive support panels 93 connected to the transformer secondary. A food package 17 is shown in place supported along its transverse edges by panels 93. A pair of combination clamping members and top covers 105 are hinged at hinges 91 fixed to the upward extending transverse sidewalls of base 13. Combination members 105 act as clamping panels 89 of FIGS. 3 and 4 to hold package 17 against the conductive panels 93 and in addition function as a top cover for the enclosure. In the closed position a pair of hooks 107 engage pins 109 on the members 105 to hold the members tightly closed.

In describing FIGS. 9-13 the same numbers but with prime marks will be used to denote structural elements generally corresponding to those appearing in FIGS. 1-8.

In FIG. 9 a cut-away view shows a portion of a TV-dinner tray 17 held between the contact end of the secondary 59' and a clamp 69'. Clamp 69' and secondary end 59' are each oversize or massive to facilitate thermal conduction and cooling near the the end of the TV tray 17. Cooling fins 60 fixed to clamp 69' and secondary end 59' further facilitate cooling of the tray end so that undue heating of the food in the end of the tray does not occur due to the additional heat received by the food as a result of the sloping bottom of the tray adjacent the tray end. This structure may be employed in any of the heating appliances shown in FIGS. 1, 3, 5 and 8.

Figure 10:
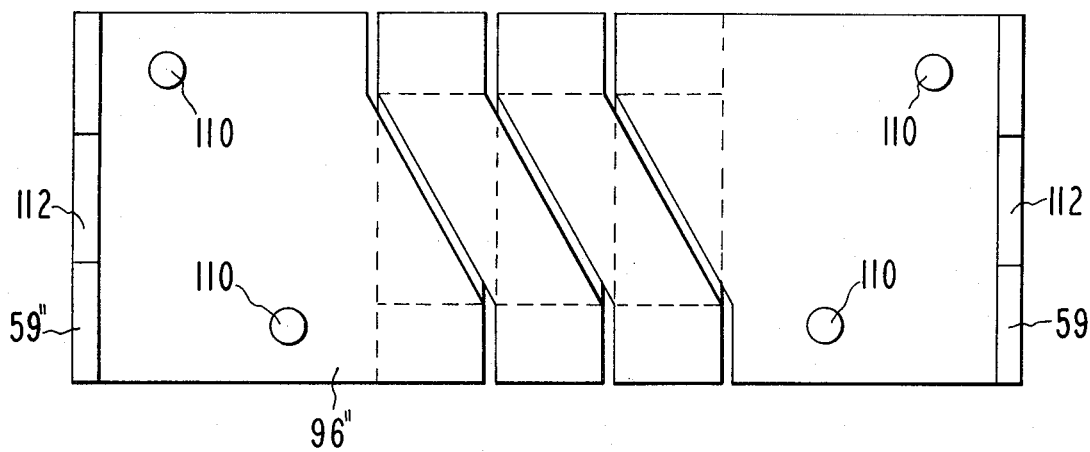
FIG. 10 is a plan view of a modified secondary having split contact ends and studs usable in the heating appliance of FIGS. 1, 3, 5 or 8.
Figure 11:
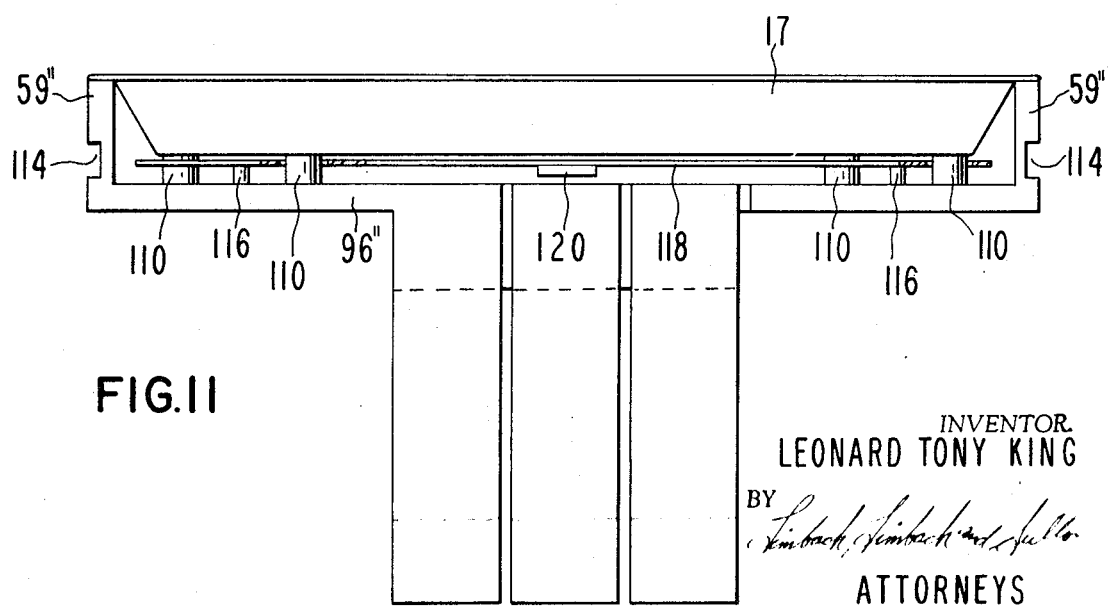
FIG. 11 is a side elevation view of the secondary of FIG. 10 additionally showing the narrowed cross section secondary ends and the thermal integrating plate.
Figure 12:
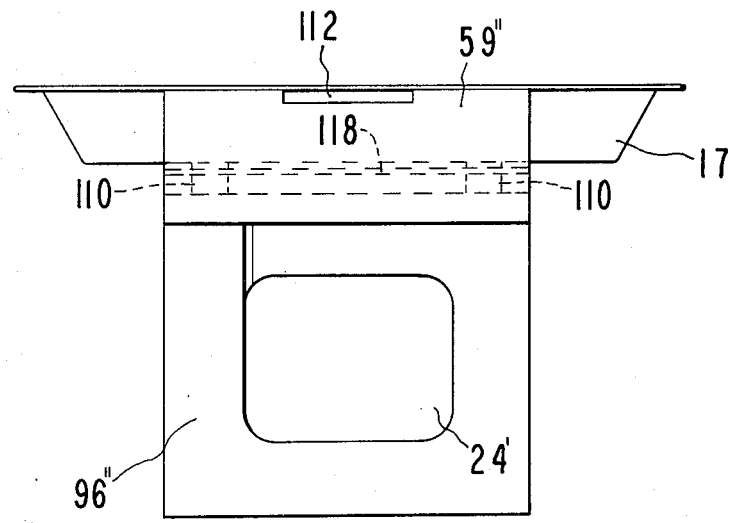
FIG. 12 is an end elevation view of the secondary of FIG. 10.

FIGS. 10 through 12 show a modified secondary configuration usable in any of the appliances shown in FIGS. 1, 3, 5 and 8. The secondary 96" is formed from a unitary piece whose central section encircles the core 24' of a step-down transformer. The secondary extends horizontally above the transformer outward to a pair of vertical supporting arms 59" spaced to engage the opposed edges of a TV-dinner tray 17. A notch 112 is cut from the ends of the upward extending portion 59" of the secondary 96" so that two sets of contacts are provided with each edge of the tray 17. This doublet jaw configuration coupled with the relatively narrow width of the contact length in comparison to the edge dimension of the tray 17 results in more uniform current distribution through the tray 17. A pair of channels 114 are cut out of the cross section of the upward extending portion 59" of the secondary 96" in order to provide a thermal resistance to reduce heating of the secondary. A thermal integrating plate 118 is substantially coextensive with the transverse and longitudinal dimensions of the tray 17 and is spaced just below the bottom of the tray 17 by thermal and electrical insulators 116 mounted on the horizontal portion of the secondary 96". A plurality of contacting studs 110, which may be configurations other than circular, are located so as to contact portions of a TV-dinner which are most frequently in need of additional heating. The location of studs 110 may be varied to suit the heating needs of the particular type of TV-dinner most frequently encountered. Thermostat 120 is mounted on the bottom of the integrating plate 118 in order to sense the average temperature of the tray 17 picked up by the plate 118.

Figure 13:
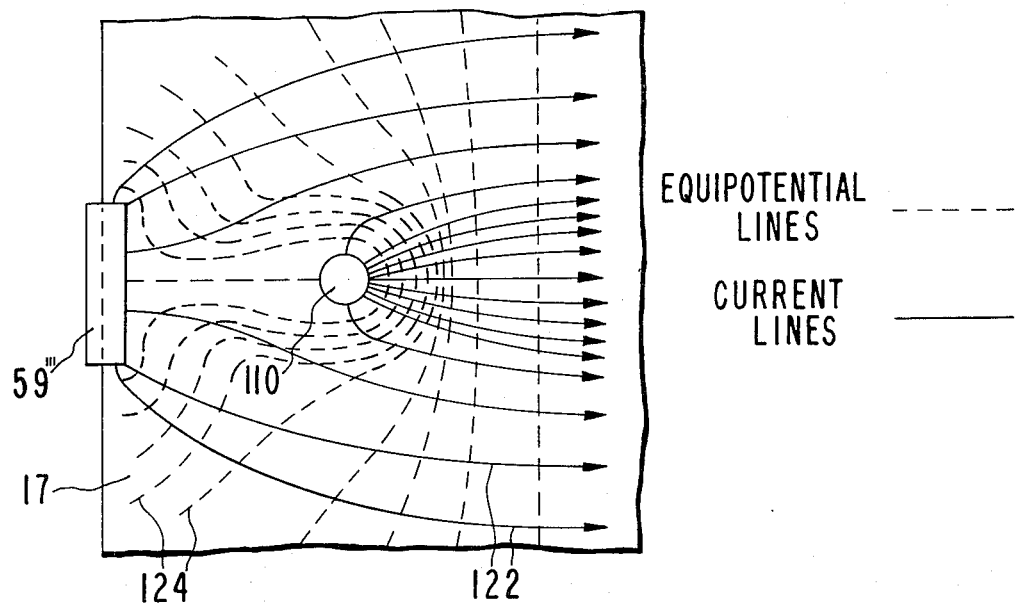
FIG. 13 is a cut-away plan view showing the current and equipotential lines in a TV-dinner tray.

FIG. 13 shows a cut-away portion of a TV-dinner tray 17 in contact with the vertical portion of the secondary 59''' and with a contacting stud 110. Contact 59''' is significantly narrower than the edge of the tray 17. Lines 122 indicate the current flow in the wall of the tray 17 and lines 124 indicate the equipotential of the voltage. It will be appreciated that the greatest heating is produced where the current lines are located most closely together. Thus, the location of studs 110 may be chosen to provide heating where particularly necessary in the tray 17. It will also be apparent that the positioning of the stud 110 and the narrowing of the contact 59''' reduces the current density near the edge of the tray in order to prevent or minimize burning of the food in the tray edge.

Although an exemplary embodiment of the invention has been shown and described, many changes, modifications, and substitutions may be made by one having ordinary skill in the art without necessarily departing from the spirit and scope of this invention.

I claim:

1. Apparatus for rapidly heating food in a container completely conductive adjacent the food between first and second generally opposed edge portions comprising:
   A. base support means,
   B. step-down transformer means mounted on said base support means, said transformer means including a core, a primary winding, and a secondary winding encircling said core and extending therefrom to provide electrically conductive supports spaced apart a distance substantially corresponding to said first and second edge portions and being dimensioned for supporting and electrically contacting said container along less than substantially the full length of each of said first and second edge portions, and
   C. means for maintaining said container in close engagement with said supports to provide a low resistance electrical connection.

2. The combination of claim 1 wherein said container is supported in closely space relationship to said transformer core to minimize transformer leakage reactance losses and resistance losses in said secondary.

3. The combination of claim 2 further comprising:
   A. a thermal integrating plate held by said base support means in a close relationship to said container when maintained in close engagement with said supports, and
   B. a thermostat for sensing the temperature of said thermal integrating plate.

4. The combination of claim 2 wherein said supports and said means for maintaining said container in close engagement with said supports have substantial mass to provide conduction cooling of the segments of said container adjacent said first and second edge portions, at least one end of said secondary is split into at least two spaced-apart lengths for providing a plurality of spaced-apart electrically conductive supports along at least one of said first and second container edge portions and further comprising at least one electrically conductive member connected to said secondary winding disposed to contact said container between said edge portions when said container is maintained in close engagement with said supports, the location of a conductive member being chosen to contact a portion of said container containing food requiring more heating than other food in said container, means for providing a high thermal resistance in said secondary between said supports and said transformer means core, a thermal integrating plate held by said base support means in a closely spaced relationship to said container when maintained in close engagement with said supports, and a thermostat for sensing the temperature of said thermal integrating plate.

5. Apparatus for rapidly heating food in a container completely conductive adjacent the food between first and second generally opposed edge portions comprising
 a step-down transformer, said transformer including a core, a primary winding, and a secondary winding extending from said core to provide electrically conductive supports spaced apart a distance substantially corresponding to said first and second generally opposed edge portions and being dimensioned for supporting and electrically contacting said container along less than substantially the full length of each of said first and second generally opposed edge portions, and
 mechanical advantage latching means forcing said container edge portions and said supports into close low resistance engagement.

6. The combination of claim 5 wherein said supports have substantial mass to provide conduction cooling of the segments of said container adjacent said first and second edge portions.

7. The combination of claim 6 further comprising thermal cooling fins fixedly attached to at least one of said supports.

8. The combination of claim 5 wherein at least one end of said secondary is split into at least two spaced-apart lengths for providing a plurality of spaced-apart electrically conductive supports along at least one of said first and second container edge portions.

9. The combination of claim 17 further comprising at least one electrically conductive member connected to said secondary winding disposed to contact said container between said edge portions when said container is maintained in close engagement with said supports.

10. The combination of claim 9 wherein the location of a conductive member is chosen to contact a portion of said container containing food requiring more heating than other food in said container.

11. The combination of claim 5 wherein said supports have substantial mass to provide conduction cooling of the segments of said container adjacent said first and second edge portions and further comprising means for providing a high thermal resistance in said secondary between said supports and said transformer means core.

12. The combination of claim 5 wherein said supports have substantial mass to provide conduction cooling of the segments of said container adjacent said first and second edge portions and at least one end of said secondary is split into at least two spaced-apart lengths for providing a plurality of spaced-apart electrically conductive supports along at least one of said first and second container edge portions.

13. The combination of claim 5 wherein said supports have substantial mass to provide conduction cooling of the segments of said container adjacent said first and second edge portions and further comprising at least one electrically conductive member connected to said secondary winding disposed to contact said container between said edge portions when said container is maintained in close engagement with said supports.

14. The combination of claim 5 further comprising means for providing a high thermal resistance in said secondary between said supports and said transformer means core and at least one electrically conductive member connected to said secondary winding disposed to contact said container between said edge portions when said container is maintained in close engagement with said supports.

15. The combination of claim 5 wherein at least one end of said secondary is split into at least two spaced-apart lengths for providing a plurality of spaced-apart electrically conductive supports along at least one of said first and second container edge portions and further comprising at least one electrically conductive member connected to said secondary winding disposed to contact said container between said edge portions when said container is maintained in close engagement with said supports.

16. The combination of claim 5 further comprising means for providing a high thermal resistance in said secondary between said supports and said transformer means core.

17. The combination of claim 5 wherein at least one end of said secondary is split into at least two spaced-apart lengths for providing a plurality of spaced-apart electrically conductive supports along at least one of said first and second container edge portions and further comprising means for providing a high thermal resistance in said secondary between said supports and said transformer means core.

* * * * *

UNITED STATES PATENT OFFICE
CERTIFICATE OF CORRECTION

Patent No. 3,715,975                Dated February 13, 1973

Inventor(s)     Leonard Tony King

It is certified that error appears in the above-identified patent and that said Letters Patent are hereby corrected as shown below:

On the cover sheet [73] "Speedline Partnership" should read -- Speedine Partnership --. Column 3, line 41, "be" should read -- by --. Column 6, lines 64 and 65, "include" should read -- includes --. Column 10, line 54, "space" should read -- spaced --.

Signed and sealed this 19th day of February 1974.

(SEAL)
Attest:

EDWARD M. FLETCHER, JR.                C. MARSHALL DANN
Attesting Officer                      Commissioner of Patents